United States Patent
Kang et al.

(10) Patent No.: US 10,423,569 B2
(45) Date of Patent: Sep. 24, 2019

(54) DEFAULT CALIBRATED SENSOR MODULE SETTINGS

(71) Applicant: Hewlett-Packard Development Company, L.P., Houston, TX (US)

(72) Inventors: Jinman Kang, San Diego, CA (US); Amit A Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 207 days.

(21) Appl. No.: 15/329,511

(22) PCT Filed: Jul. 29, 2014

(86) PCT No.: PCT/US2014/048569
§ 371 (c)(1),
(2) Date: Jan. 26, 2017

(87) PCT Pub. No.: WO2016/018243
PCT Pub. Date: Feb. 4, 2016

(65) Prior Publication Data
US 2017/0322903 A1    Nov. 9, 2017

(51) Int. Cl.
*G06F 15/177*    (2006.01)
*H04N 17/00*    (2006.01)
(Continued)

(52) U.S. Cl.
CPC ........ *G06F 15/177* (2013.01); *G06F 15/0283* (2013.01); *G06T 1/0007* (2013.01);
(Continued)

(58) Field of Classification Search
CPC ........ G08B 13/19678; G08B 13/19682; H04N 21/431; H04N 2005/4456;
(Continued)

(56) References Cited

U.S. PATENT DOCUMENTS 5,608,491 A    3/1997    Sasagaki et al.
5,721,989 A *  2/1998    Kitazawa ............... G03B 17/18
                                                         396/280
(Continued)

FOREIGN PATENT DOCUMENTS

EP    2091235 A2    8/2009
JP    2001174690    6/2001
(Continued)

OTHER PUBLICATIONS

Izadi et al., "C-Stale: A Multi-Touch and Object Recognition System for Remote Collaboration using Horizontal Surfaces,", 2007, pp. 3-10, IEEE.
(Continued)

*Primary Examiner* — Chia Wei A Chen
(74) *Attorney, Agent, or Firm* — HP Inc. Patent Department (57) ABSTRACT

Examples of a system, method, and machine-readable non-transitory storage medium including instructions executable by a processor are disclosed herein. An example of the machine-readable non-transitory storage medium includes instructions executable by a processor to allow selection of a capture mode of a sensor module to record still images and/or a video mode of the sensor module to record video, retrieve default calibrated sensor module settings from a persistent memory, allow creation of at least one user defined sensor module setting that differs from one of the default calibrated sensor module settings, and utilize the at least one user defined sensor module setting along with the remaining default calibrated sensor module settings with the selected sensor module mode.

14 Claims, 5 Drawing Sheets

(51) Int. Cl.
*G06F 15/02* (2006.01)
*G06T 1/00* (2006.01)
*H04N 5/232* (2006.01)

(52) U.S. Cl.
CPC .......... *H04N 5/232* (2013.01); *H04N 5/23245* (2013.01); *H04N 17/002* (2013.01)

(58) Field of Classification Search
CPC ....... H04N 2005/44565; H04N 5/4403; H04N 5/44543; H04N 17/002; H04N 5/232; H04N 5/23245; H04N 1/00087; G06F 3/048; G06F 15/0283; G06F 15/177; G06T 1/0007
See application file for complete search history.

(56) References Cited

U.S. PATENT DOCUMENTS

| | | | |
|---|---|---|---|
| 6,134,606 A | 10/2000 | Anderson et al. | |
| 6,208,379 B1* | 3/2001 | Oya | G08B 13/1968 348/143 |
| 6,778,770 B1* | 8/2004 | Cazier | G03B 7/26 348/372 |
| 6,970,194 B1* | 11/2005 | Smith | H04N 5/367 250/559.04 |
| 6,980,234 B2* | 12/2005 | Kitawaki | B60N 2/0228 348/207.1 |
| 6,989,861 B2 | 1/2006 | Schinner | |
| 7,599,561 B2 | 10/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 9,607,201 B1* | 3/2017 | Schafer | G06Q 10/00 |
| 9,807,838 B1* | 10/2017 | Mondal | H04L 67/06 |
| 2001/0052067 A1* | 12/2001 | Klein | G06F 9/4401 713/1 |
| 2004/0218065 A1 | 11/2004 | Schinner | |
| 2005/0007465 A1* | 1/2005 | Terasawa | H04N 1/00352 348/231.6 |
| 2005/0078092 A1 | 4/2005 | Clapper | |
| 2005/0185055 A1* | 8/2005 | Miller | G06F 8/60 348/207.1 |
| 2007/0132839 A1 | 6/2007 | Pang et al. | |
| 2008/0018591 A1 | 1/2008 | Pittel et al. | |
| 2008/0266407 A1* | 10/2008 | Battles | H04N 5/232 348/211.2 |
| 2008/0266541 A1 | 10/2008 | Yung et al. | |
| 2009/0066807 A1* | 3/2009 | Miyanishi | H04N 5/23212 348/231.2 |
| 2009/0105538 A1 | 4/2009 | Van Dam et al. | |
| 2009/0123135 A1 | 5/2009 | Amling et al. | |
| 2009/0202235 A1 | 8/2009 | Li et al. | |
| 2010/0096461 A1 | 4/2010 | Kollarsky et al. | |
| 2010/0245590 A1 | 9/2010 | Cazier et al. | |
| 2010/0271489 A1* | 10/2010 | Muukki | H04N 5/3572 348/187 |
| 2010/0289941 A1* | 11/2010 | Ito | G02B 7/365 348/345 |
| 2010/0322465 A1 | 12/2010 | Wesche et al. | |
| 2011/0116685 A1* | 5/2011 | Sugita | H04N 5/23219 382/103 |
| 2011/0242054 A1 | 10/2011 | Tsu | |
| 2011/0273606 A1* | 11/2011 | Hara | G03B 17/02 348/333.02 |
| 2012/0162472 A1 | 6/2012 | Amling et al. | |
| 2012/0206632 A1 | 8/2012 | Imai | |
| 2012/0257065 A1 | 10/2012 | Velarde et al. | |
| 2013/0077236 A1 | 3/2013 | Becze et al. | |
| 2013/0127901 A1* | 5/2013 | Georgiev | H04N 17/002 345/620 |
| 2013/0215289 A1* | 8/2013 | Vitsnudel | H04N 5/232 348/231.99 |
| 2014/0152777 A1* | 6/2014 | Galor | H04N 5/2254 348/47 |
| 2014/0340534 A1* | 11/2014 | Kusaka | H04N 1/00281 348/207.1 |
| 2015/0213588 A1* | 7/2015 | Wang | H04N 13/246 348/47 |
| 2015/0382436 A1* | 12/2015 | Kelly | G08C 17/02 315/131 |
| 2017/0176034 A1* | 6/2017 | Hussain | F24F 11/30 |

FOREIGN PATENT DOCUMENTS

TW 201007367 A 2/2010
WO WO-2009/018612 A1 2/2009

OTHER PUBLICATIONS

Release Notes for Version 2.3, Lumenera Network Camera firmware Version 2.3.1.6, Release Notes—Intelligent Series, Mar. 18, 2013, pp. 1-7, Lumenera Corporation.

* cited by examiner

DEFAULT CALIBRATED SENSOR MODULE SETTINGS

BACKGROUND

End users appreciate quality images and video. They also appreciate the ability to easily use devices that create such images and video. Designers and manufacturers may, therefore, endeavor to create and provide technology directed toward at least some of these objectives.

BRIEF DESCRIPTION OF THE DRAWINGS

The following detailed description references the drawings, wherein.

DETAILED DESCRIPTION

Sensor modules that record still images or video may have unit-by-unit variations in their individual components. For example, the illumination sources of sensor modules may vary in the intensity of their light output or the wavelength of the light they emit. As another example, the photosensitive members of sensor modules may differ in their responsiveness to different wavelengths of light. These sensor module unit-by-unit variations can result in visually perceptible differences in the images and/or video they produce. For example, the colors in these images and/or video may differ enough so as to be noticeable by and objectionable to cud users of the sensor modules or the devices in which they are used. As another example, the contrast of images and/or video of the same subject taken by different sensor modules may vary enough so as to be perceptible by and a concern to end users of the sensor modules or the devices in which they are utilized.

Addressing these technical challenges caused by such unit by unit variations may assist such end users by providing them with more consistent and visually pleasing images and/or video between different sensor modules. This may be achieved by creating a set of default calibrated sensor module settings that are utilized with different sensor modules, as shown, for example, in FIGS. 1-6.

Developers that utilize sensor modules in devices, as well as end users of such sensor modules and devices, may appreciate the ability to create and utilize at least one user defined sensor module setting that differs from one of a set of default calibrated sensor module settings. This provides flexibility to such developers and end users. Retaining this at least one user defined sensor module setting for subsequent use, until no longer desired, along with any remaining default calibrated sensor module settings saves developer and end user time because they do not have to repeatedly recreate the user defined sensor module setting each time they want to use a sensor module in a customized manner. Examples directed to addressing these technical challenges are shown in FIGS. 1-6.

As used herein, the term "sensor module" represents, but is not necessarily limited to, a photosensitive n ember and an illumination source that are utilized to record still images and/or video. Examples of a photosensitive member include, but are not limited to, a charge-coupled device (CCD), a complementary metal-oxide semiconductor (CMOS), a camera, film, a light-sensitive plate, light sensitive paper, or any combination of the foregoing. Examples of an illumination source include, but are not limited to, a light-emitting diode (LED), a bulb, a tube, a laser, a reflector, a lens, ambient lighting, or any combination of the foregoing.

As used herein, the term "processor" represents, but is not necessarily limited to, an instruction execution system such as a computer-based system, an Application Specific Integrated Circuit (ASIC), a computing device, a hardware and/or machine-readable instruction system, or any combination thereof, that can fetch or obtain the logic from a machine-readable non-transitory storage medium and execute the instructions contained thereon. "Processor" can also include any controller, state-machine, microprocessor, logic control circuitry, cloud-based utility, service or feature, any other analogue, digital and/or mechanical implementation thereof, or any combination of the forgoing, A processor may be a component of a distributed system.

As used herein, the term "distributed system" represents, but is not necessarily limited to, multiple processors and machine-readable non-transitory storage media in different locations or systems that communicate via a network, such as the cloud. As used herein, the term "cloud" represents, but is not necessarily limited to, computing resources (hardware and/or machine readable instructions) that are delivered as a service over a network (such as the internet).

As used herein, the term "machine-readable non-transitory storage medium" represents, but is not necessarily limited to, any medium that can contain, store, retain, or maintain programs, code, scripts, information, and/or data. A machine-readable non-transitory storage medium may include any one of many physical media such as, for example, electronic, magnetic, optical, electromagnetic, or semiconductor media. A machine-readable non-transitory storage medium may be a component of a distributed system. More specific examples of suitable machine-readable non-transitory storage media include, but are not limited to, a magnetic computer diskette such as floppy diskettes or hard drives, magnetic tape, a read-only memory (ROM), an erasable programmable read-only memory (EPROM), a flash drive or memory, a compact disc (CD), a digital video disk (DVD), or a memristor.

As used herein, the term "persistent memory" represents, but is not necessarily limited to, any structure, apparatus, memory, method and/or machine-readable non-transitory storage medium for storing data and information such that it can be continually accessed using instructions and/or application programming interfaces (APIs) even after the end of the process that, created or last modified them. As used herein the, term "memory" represents, but is not necessarily limited to, a device and/or process that allows data and information to be stored thereon for subsequent retrieval by, for example, a processor.

As used herein, the term "circuitry" represents, but is not necessarily limited to, an interconnection of elements such as a resistor, inductor, capacitor, voltage source, current source, transistor, diode, application specific integrated circuit (ASIC), processor, controller, switch, transformer, gate, timer, relay, multiplexor, connector, comparator, amplifier, filter, and/or module having these elements that allow operations to be performed alone or in combination with other elements or components. As used herein, the terms "include", "includes", "including", "have", "has", "having," and variations thereof, mean the same as the terms "comprise", "comprises", and "comprising" or appropriate variations thereof.

Figure 1:
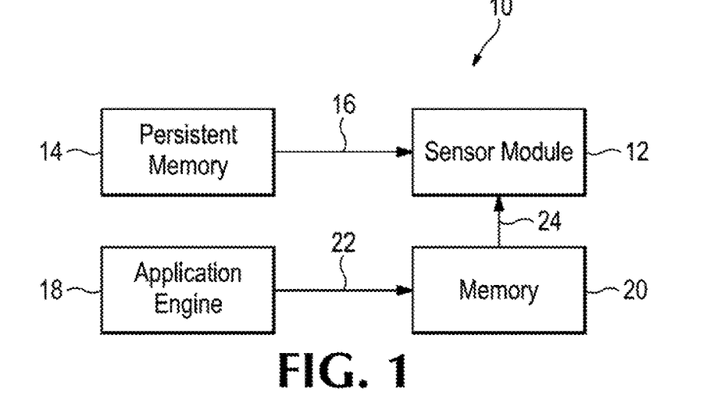
FIG. 1 is an example of a system in accordance with an implementation.

An example of a system 10 in accordance with an implementation is shown in FIG. 1. As can be seen in FIG. 1, system 10 includes a sensor module 12 that has a capture mode to record still images and a video mode to record video. System 10 also includes a persistent memory 14 to store default calibrated sensor module settings to use with sensor module 12 in the capture mode and the video mode, as generally indicated by arrow 16. These default calibrated sensor module settings are intended to address the above-described technical challenges that may arise due to unit by unit variations between different sensor modules so that still images and video of sensor modules, such as sensor module 12, are more consistent and visually pleasing. These default calibrated sensor module settings may include, but are not necessarily limited to, at least one of the following parameters or settings: white balance, contrast, resolution, sensitivity, color space, aperture, shutter speed, compression, noise reduction, frames per second, metering pattern, and exposure compensation. In at least sonic examples of system 10, these default calibrated sensor module settings may he different for the capture mode and the video mode of sensor module 12.

As can also be seen in FIG. 1, system 10 includes an application engine 18 to allow creation of at least one user defined sensor module setting that differs from one of the default calibrated sensor module settings to use with sensor module 12 in the capture mode and/or the video mode. Application engine 16 represents any circuitry, processor, executable instructions, application programming interfaces (APIs), machine-readable non-transitory storage medium, or any combination thereof, that provides a user interface to allow developers and end users to create the at least one user defined sensor module setting. In at least some examples of system 10, application engine 18 allows creation and storage of different at least one user defined sensor module settings for the capture mode and video mode of sensor module 12.

As can additionally be seen in FIG. 1, system 10 includes a memory 20 to store the at least one user defined senor module setting, as generally indicated by arrow 22, to use with sensor module 12 in the capture mode and/or video mode, as generally indicated by arrow 24, along with any remaining default calibrated sensor module settings from persistent memory 14, as generally indicated by arrow 16. In at least some examples of system 10, memory 20 may also be a persistent memory.

Figure 2:
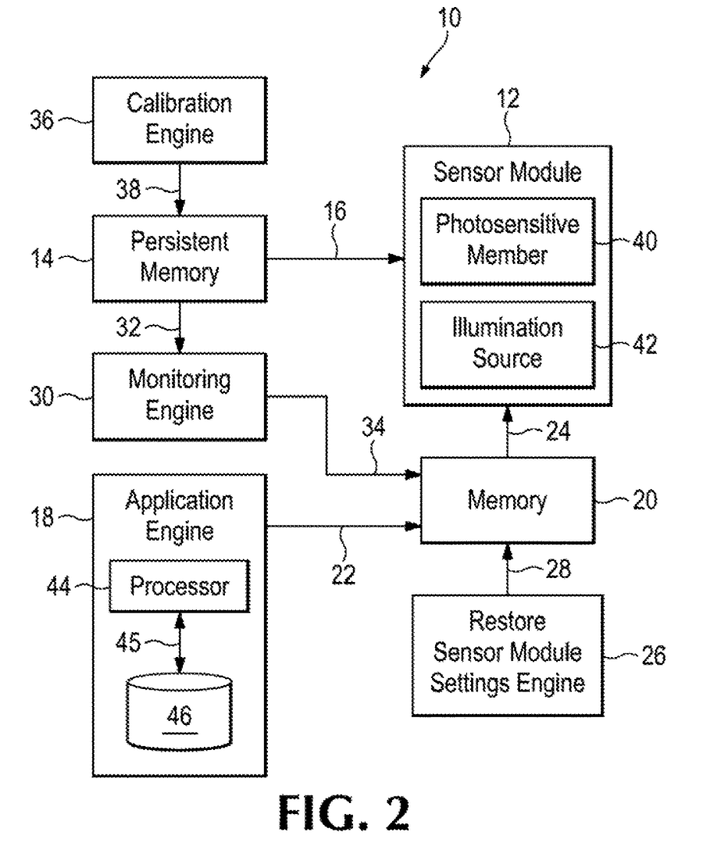
FIG. 2 is an example of additional elements of the system of FIG. 1 in accordance with an implementation.

An example of additional elements of system 10 in accordance with an implementation is shown in FIG. 2. As can be seen in FIG. 2, system 10 may include a restore sensor module settings engine 26 to allow removal of the at least one user defined sensor module setting from memory 20 and replacement of the removed at least one user defined sensor module setting with a corresponding default calibrated sensor module setting to use with sensor module 12, as generally indicated by arrow 28. Restore sensor module settings engine 16 represents any circuitry, processor, executable instructions, application programming interfaces (APIs), machine-readable non-transitory storage medium, or any combination thereof, that provides a user interface to allow developers and end users to perform this removal and replacement.

As can also be seen in FIG. 2, system 10 may additionally or alternatively include a monitoring engine 30 to retrieve the default calibrated sensor module settings from persistent memory 14, as generally indicated by arrow 32, and to, restore the default calibrated sensor module settings to memory 20, as generally indicated by arrow 34, based on a loss of power to sensor module 12 or other components of system 10. Monitoring engine 30 represents any circuitry, processor, executable instructions, application programming interfaces (APIs), machine-readable non-transitory storage median, or any combination thereof, that monitors power to system 10 and performs this retrieval and restoration of the default calibrated sensor module settings in the event of a power loss or power cycling to sensor module 12 or other components of system 10.

As can additionally be seen in FIG. 2, system 10 may also or alternatively include a calibration engine 36 to create the default calibrated sensor module settings to address unit by unit variation between different sensor modules. These default calibrated sensor module settings are then loaded into and stored by persistent memory 14, as generally indicated by arrow 38. Calibration engine 36 represents any circuitry, processor, executable instructions, application programming interfaces (APIs), machine-readable non-transitory storage medium, or any combination thereof, that creates the default calibrated sensor module settings to address unit by unit variations between different sensor module for at least the reasons discussed above.

As can further be seen in FIG. 2, sensor module 12 may include a photosensitive member 40 and an illumination source 42. Additionally or alternatively, application engine 18 may include a processor 44 and a machine-readable non-transitory storage medium 46 including instructions executable by processor 44, as generally indicated by double-headed arrow 45, to allow creation of the at least one user defined sensor module setting that differs from one of the default calibrated sensor module settings to use with the sensor module in the capture mode and/or the video mode.

Figure 3:
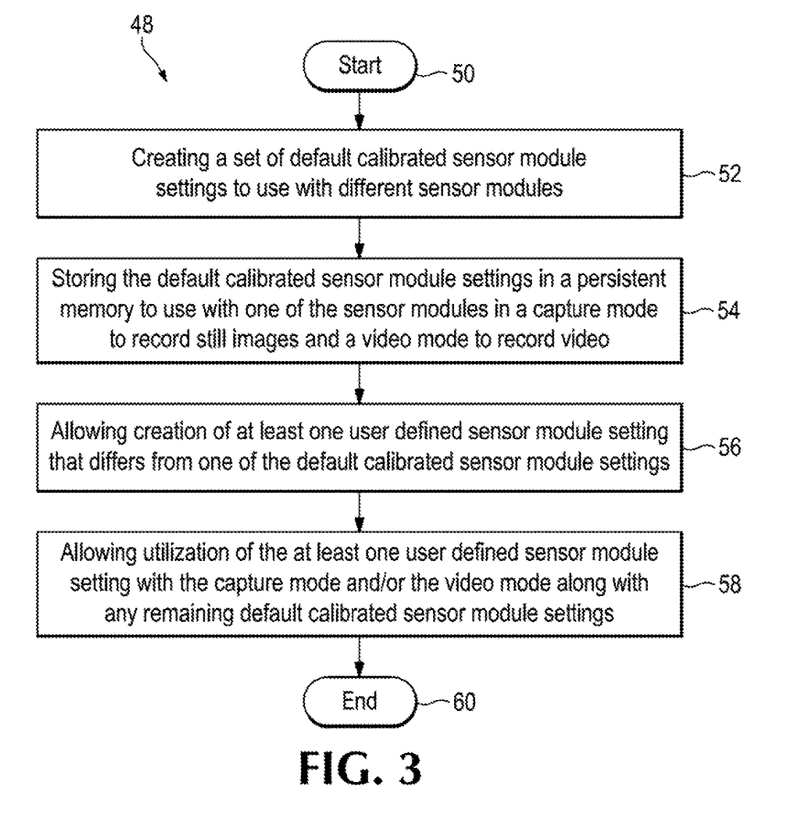
FIG. 3 is, an example of a method in accordance with an implementation.

An example of a method 48 in accordance with an implementation is shown in FIG. 3. As can be seen in FIG. 3, method 48 begins or starts 50 by creating a set of default calibrated sensor module settings to use with different sensor modules that have unit by unit variations, as indicated by block 52, and storing the default calibrated sensor module settings in a persistent memory to use with one of the sensor modules in a capture mode to record still images and a video mode to record video, as indicated by block 54. In at least some examples of method 48, the sensor module may include a photosensitive member and an illumination source. Method 48 continues by allowing creation of at least one user defined sensor module setting that differs from one of the default calibrated sensor module settings (e.g., via a user interface), as indicated by block 56, and allowing utilization of the at least one user defined sensor module setting with the capture mode and/or the video mode along with any remaining default calibrated sensor module settings, as indicated by block 58. Method 48 may then conclude or end 60.

Figure 4:
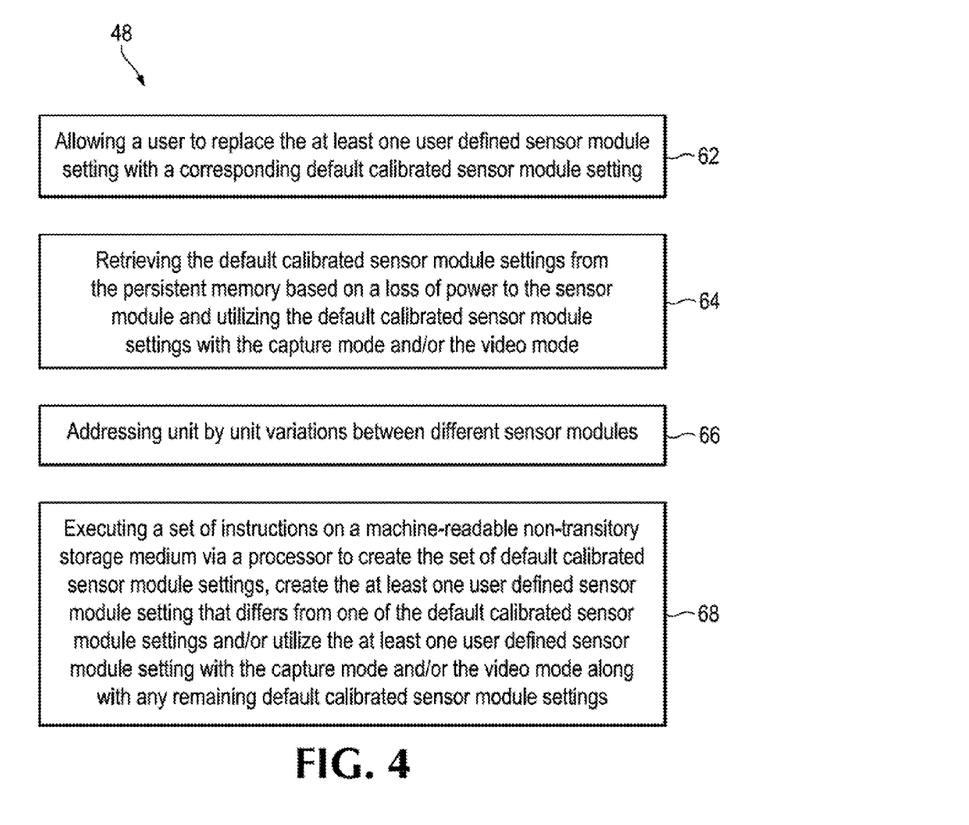
FIG. 4 is an example of additional elements of the method of FIG. 3 in accordance with an implementation.

An example of additional elements of method 48 in accordance with an implementation is shown in FIG. 4. As can be seen in FIG. 4, method 48 may additionally include allowing a user to replace the at least one user defined sensor module setting with a corresponding default calibrated sensor module setting (e.g., via a user interface), as indicated by block 62. As can also be seen in FIG. 4, method 48 may additionally or alternatively include retrieving the default calibrated sensor module settings from the persistent memory based on a loss of power to the sensor module and utilizing the default calibrated sensor module settings with the capture mode and/or the video mode, as indicated by block 64.

As can additionally be seen in FIG. 4, method 48 may address unit by unit variations between different sensor modules, as indicated by block 66, by creating the set of default calibrated sensor module settings to use with different sensor, modules, as indicated by block 52. As can further be seen in FIG. 4, method 48 may alternatively or additionally include executing a set of instructions on a machine-readable non-transitory storage medium via a processor to create the set of default calibrated sensor module settings, create the at least one user defined sensor module setting that differs from one of the default calibrated sensor module settings and/or utilize the at least one user defined sensor module setting with the rapture mode and/or the video mode along with any remaining default calibrated sensor module settings as indicated by block. 68.

Figure 5:
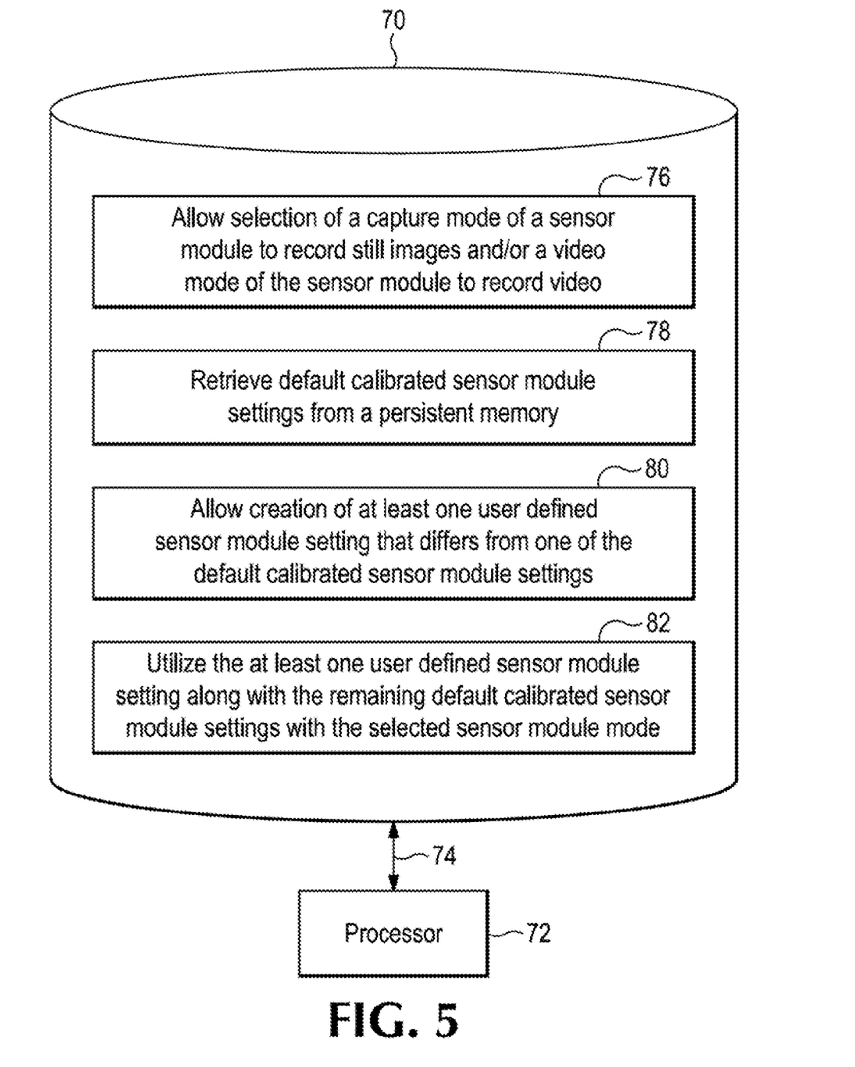
FIG. 5 is an example of a machine-readable non-transitory storage medium including instructions executable by a processor in accordance with an implementation.

An example of a machine-readable non-transitory storage medium 70 including instructions executable by a processor 72, as generally indicated by double-headed arrow 74, in accordance with an implementation is shown in FIG. 5. As can be, seen, in FIG. 5, machine-readable non-transitory storage medium 70 includes instructions 76, executable by processor 72, to allow selection (e.g., via a user interface) of a capture mode of a sensor module to record still images and/or a video mode of the sensor module to record video and instructions 78, executable by processor 72, to retrieve default calibrated sensor module settings from a persistent memory. As can also be seen in FIG. 5, machine-readable non-transitory storage medium 70 includes instructions 80, executable by processor 72, to allow creation (e.g., via a user interface) of at least one user defined sensor module setting that differs from one of the default calibrated sensor module settings and instructions 82, executable by processor 72, to utilize the at least one user defined sensor module setting along with the remaining default calibrated sensor module settings with the selected sensor module mode.

Figure 6:
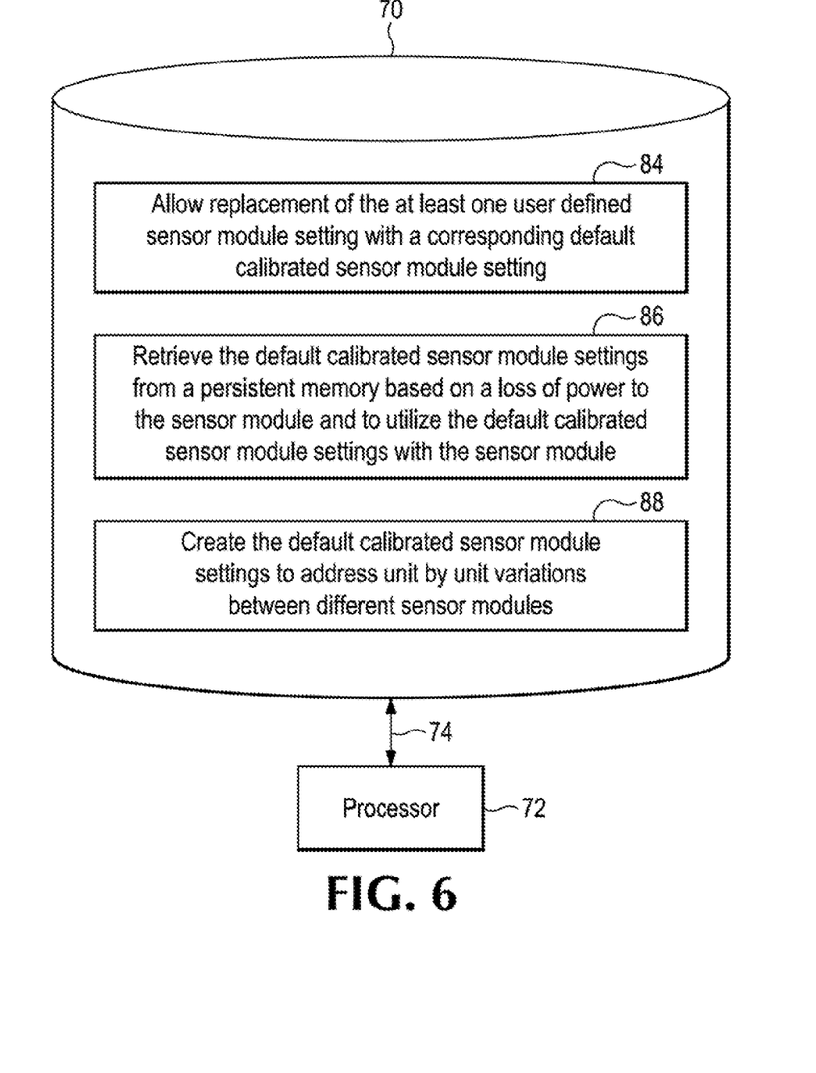
FIG. 6 is an example of additional instructions in accordance with an implementation that are executable by a processor that may be included on the machine-readable non-transitory storage medium of FIG. 5.

An example of additional instructions in accordance with an implementation that are executable by processor 72, as generally indicated by double-headed arrow 74, that may be included on machine-readable non-transitory storage medium 70 are shown in FIG. 6. As can be seen in FIG. 6, machine-readable non-transitory storage medium 70 may include instructions 84, executable by processor 72, to allow replacement of the at least one user defined sensor module setting with a corresponding default calibrated sensor module setting. As can also be seen in FIG. 6, machine-readable non-transitory storage medium 70 may additionally or alternatively include instructions 86, executable by processor 72, to retrieve the default calibrated sensor module settings from a persistent memory based on a loss of power to the sensor module and to utilize the default calibrated sensor module settings with the sensor module. As can additionally be seen in FIG. 6, machine-readable non-transitory storage medium 70 may also or alternatively include instructions 88, executable by processor 72, to create the default calibrated sensor module settings to address unit by unit variations between different sensor modules.

Although several drawings have been described and illustrated in detail, it is to be understood that the same are intended by way of illustration and example. These examples are not intended to be exhaustive or to be limited to the precise form disclosed. Modifications, additions, and variations may well be apparent. For example, although not shown in FIGS. 1-6, it is to be understood that sensor module 12, persistent memory 14, restore sensor module settings engine 26, monitoring engine 30 and/or calibration engine 36 may include a processor and a machine-readable non-transitory storage medium including instructions executable by that processor.

Additionally, reference to an element in the singular is not intended to mean one, unless explicitly so stated, but rather means at least one. Furthermore, unless specifically stated, any method elements are not limited to the sequence or order described and illustrated. Moreover, no element or component is intended to be dedicated to the public regardless of whether the element or component is explicitly recited in the following claims.

What is claimed is:

1. A system, comprising:
   a sensor module including a capture mode to record still images and a video mode to record video;
   a persistent memory to store a plurality of default calibrated sensor module settings to use with the sensor module in the capture mode and the video mode;
   an application engine to allow creation of a given user defined sensor module setting that differs from a given default calibrated sensor module setting of the plurality of default calibrated sensor module settings to use with the sensor module in one of the capture mode and the video mode in place of the given default calibrated sensor module setting; and
   a memory other than the persistent memory to store the given user defined sensor module setting to use with the sensor module in one of the capture mode and the video mode along with remaining default calibrated sensor module settings of the plurality of default calibrated sensor module settings from the persistent memory.

2. The system of Claim 1, further comprising a restore sensor module settings engine to allow removal of the given user defined sensor module setting from the memory and replacement of the removed given user defined sensor module setting with a corresponding default calibrated sensor module setting to use with the sensor module.

3. The system of Claim 1, further comprising a monitoring engine to retrieve the plurality of default calibrated sensor module settings from the persistent memory and to restore the plurality of default calibrated sensor module settings to the memory based on a loss of power to the sensor module.

4. The system of Claim 1, wherein the sensor module includes a photosensitive member and an illumination source, and further wherein the memory includes an additional persistent memory.

5. The system of claim 1, wherein the application engine includes a processor and a machine-readable non-transitory storage medium including instructions executable by the processor to allow creation of the given user defined sensor module setting that differs from one of the plurality of default calibrated sensor module settings to use with the sensor module in one of the capture mode and the video mode.

6. The system of Claim 1, further comprising a calibration engine to create the plurality of default calibrated sensor module settings to address unit by unit variations between different sensor modules.

7. A method, comprising:
   creating a set of default calibrated sensor module settings to use with different sensor modules;

storing the default calibrated sensor module settings in a persistent memory to use with one of the sensor modules in a capture mode to record still images and a video mode to record video;

allowing creation of a given user defined sensor module setting that differs from a given default calibrated sensor module setting of the set of default calibrated sensor module settings to be used in place of the given default calibrated sensor module setting; and storing, in a memory other than the persistent memory, the given user defined sensor module setting with one of the capture mode and the video mode along with remaining default calibrated sensor module settings of the set of default calibrated sensor module settings.

8. The method of Claim 7, further comprising retrieving the default calibrated sensor module settings from the persistent memory based on a loss of power to the sensor module and utilizing the default calibrated sensor module settings with one of the capture mode and the video mode.

9. The method of Claim 7, wherein the sensor module includes a photosensitive member and an illumination source, and further wherein creating a set of default calibrated sensor module settings to use with different sensor modules includes addressing unit by unit variations between different sensor modules.

10. The method of Claim 7, further comprising executing a set of instructions on a machine-readable non-transitory storage medium via a processor to one of create the set of default calibrated sensor module settings, create the given user defined sensor module setting, and utilize the given user defined sensor module setting with one of the capture mode and the video mode along with the remaining default calibrated sensor module settings.

11. A machine-readable non-transitory storage medium comprising instructions executable by a processor to:

allow selection of one of a capture mode of a sensor module to record still images and a video mode of the sensor module to record video;

retrieve a plurality of default calibrated sensor module settings from a persistent memory;

allow creation of a given user defined sensor module setting that differs from a given default calibrated sensor module setting of the plurality of default calibrated sensor module settings to be used in place of the given default calibrated sensor module setting;

store the given user defined sensor module setting along with the remaining default calibrated sensor module settings of the plurality of default calibrated sensor module settings in a memory other than the persistent memory; and utilize the given user defined sensor module setting along with the plurality of remaining default calibrated sensor module settings from the persistent memory, with the selected sensor module mode.

12. The machine-readable non-transitory storage medium of Claim 11, further comprising additional instructions executable by a processor to allow replacement of the given user defined sensor module setting with a corresponding default calibrated sensor module setting.

13. The machine-readable non-transitory storage medium of Claim 11, further comprising additional instructions executable by a processor to retrieve the plurality of default calibrated sensor module settings from the persistent memory based on a loss of power to the sensor module and to utilize the default calibrated sensor module settings with the sensor module.

14. The machine-readable non-transitory storage medium of claim 11, further comprising additional instructions executable by a processor to create the plurality of default calibrated sensor module settings to address unit by unit variations between different sensor modules.

* * * * *